US012797996B2

(12) United States Patent
Rauch

(10) Patent No.: US 12,797,996 B2
(45) Date of Patent: Nov. 17, 2026

(54) METHOD FOR PRODUCING AN ELECTRODE FOR AN IGNITION DEVICE

(71) Applicant: SWACRIT SYSTEMS GMBH, Hall in Tirol (AT)

(72) Inventor: Josef Rauch, Innsbruck (AT)

(73) Assignee: Swacrit Systems GmbH, Hall in Tirol (AT)

(*) Notice: Subject to any disclaimer, the term of this patent is extended or adjusted under 35 U.S.C. 154(b) by 151 days.

(21) Appl. No.: 18/868,874

(22) PCT Filed: May 25, 2023

(86) PCT No.: PCT/AT2023/060169
§ 371 (c)(1),
(2) Date: Nov. 25, 2024

(87) PCT Pub. No.: WO2023/225699
PCT Pub. Date: Nov. 30, 2023

(65) Prior Publication Data

US 2025/0326047 A1 Oct. 23, 2025

(30) Foreign Application Priority Data

May 25, 2022 (AT) .............................. A 50376/2022

(51) Int. Cl.
*B23K 20/02* (2006.01)
*B23K 101/36* (2006.01)
(Continued)

(52) U.S. Cl.
CPC ............ *B23K 20/023* (2013.01); *H01T 13/39* (2013.01); *H01T 21/02* (2013.01); *B23K 2101/36* (2018.08)

(58) Field of Classification Search
CPC .. B23K 20/023; B23K 2101/36; H01T 13/39; H01T 13/20; H01T 21/02
See application file for complete search history.

(56) References Cited

U.S. PATENT DOCUMENTS 5,465,022 A 11/1995 Katoh et al.
6,750,597 B1 * 6/2004 Sakura .................... H01T 13/32 313/142
(Continued)

FOREIGN PATENT DOCUMENTS

DE 112016006310 T5 10/2018
DE 112019000377 T5 9/2020
(Continued)

*Primary Examiner* — Mary Ellen Bowman
(74) *Attorney, Agent, or Firm* — Laurence A. Greenberg; Werner H. Stemer; Ralph E. Locher

(57) ABSTRACT

A method produces an electrode for an ignition device. A metal electrode material is placed against a metal support material at a joining surface, and the support material and the electrode material are pressed against each other at the joining surface using a defined surface pressure and are positioned in a chamber in which a negative pressure and/or a defined atmosphere is generated and applied in the chamber. The joining surface is heated uniformly to a joining temperature, the joining temperature is maintained for a joining time such that a connection between the support material and the electrode material is produced on the joining surface. The support material and the electrode material form a flat uniform connection with each other on the basis of the joining surface. Accordingly, the joining temperature lies below the melting temperature of the support material and of the electrode material.

22 Claims, 9 Drawing Sheets

(51) Int. Cl.

| | |
|---|---|
| ***H01T 13/39*** | (2006.01) |
| ***H01T 21/02*** | (2006.01) |

(56) References Cited

U.S. PATENT DOCUMENTS

| | | | | |
|---|---|---|---|---|
| 10,312,669 | B2 * | 6/2019 | Sumoyama | H01T 21/02 |
| 10,439,369 | B1 * | 10/2019 | Niessner | H01T 13/39 |
| 10,958,045 | B2 | 3/2021 | Sumoyama et al. | |
| 11,189,993 | B2 * | 11/2021 | Grabner | H01T 13/39 |

FOREIGN PATENT DOCUMENTS

| | | | | |
|---|---|---|---|---|
| EP | 2738890 | A1 * | 6/2014 | H01T 13/39 |
| EP | 3139457 | A1 | 3/2017 | |
| EP | 3196995 | A1 | 7/2017 | |
| EP | 3694684 | A1 | 8/2020 | |

* cited by examiner

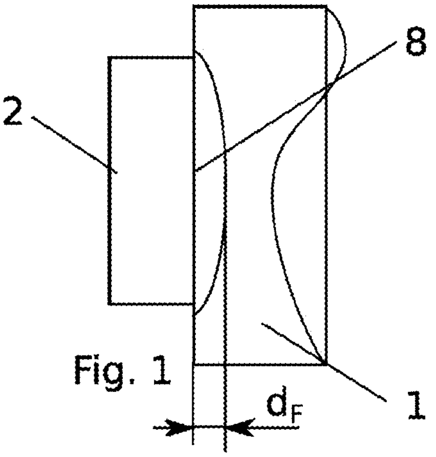
Fig. 1
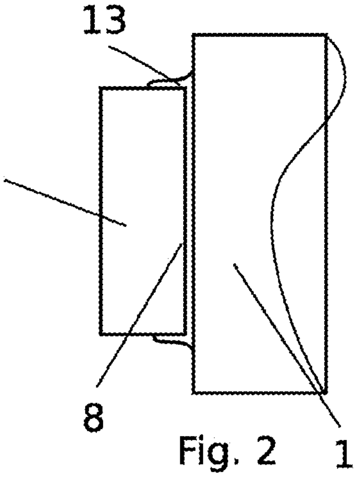
Fig. 2
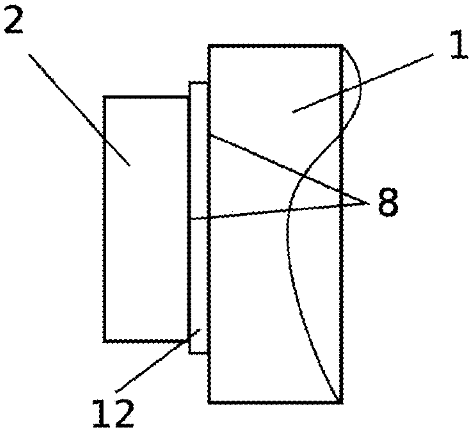
Fig. 3
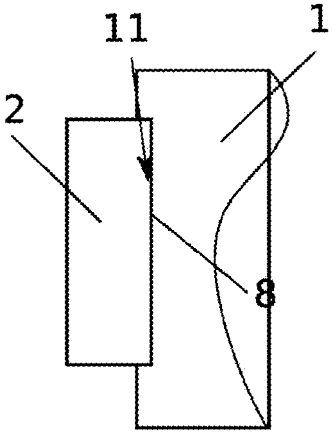
Fig. 4
Fig. 1a
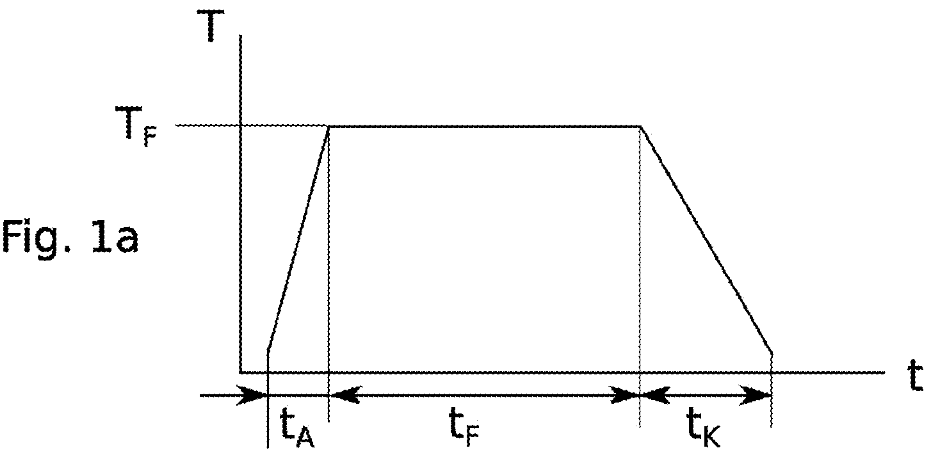

METHOD FOR PRODUCING AN ELECTRODE FOR AN IGNITION DEVICE

FIELD AND BACKGROUND OF THE INVENTION

The invention relates to a process for producing an electrode for an ignition device according to the preamble of the independent process for producing an electrode for an ignition device claim, to a process for producing a spark plug according to the preamble of the independent process for producing a spark plug claim, to a spark plug according to the preamble of the independent spark plug claim, and to an ignition device according to the preamble of the independent ignition device claim.

The prior art discloses various ignition devices with which an ignitable medium or an ignitable mixture is ignited by application of a spark from an electrode. The gases that expand on ignition bring about a change in pressure conditions, which is then usually converted to mechanical work. Such ignition devices find use, for example, in motor vehicles, gas engines or other devices known from the prior art.

The prior art likewise discloses processes for producing such ignition devices. In processes known from the prior art, for example in the case of spark plugs, an ignition gap is formed between two electrodes, for example between center electrode and ground electrode, comprising precious metal electrodes. A potential difference is then applied to the precious metal electrodes, and a spark is generated across the ignition gap. The precious metal electrodes usually consist of platinum alloys or iridium alloys or else other alloys that are disposed on a nickel carrier. The bond between the nickel carrier and the precious metal electrode is established in the prior art by laser welding. Laser welding proceeding from the object surface brings about a cohesive linear bond between the precious metal electrode and the carrier with low bond thickness in the center of the contact areas.

EP 2738890 A1 (TANAKA PRECIOUS METAL IND), published 4 Jun. 2014, DE 112019000377 T5 (NGK SPARK PLUG CO), published 17 Sep. 2020, U.S. Pat. No. 6,750,597 B1 (SAKURA, A.), published 15 Jun. 2004, EP 3139457 A1 (NGK SPARK PLUG CO), published 8 Mar. 2017, and DE 112016006310 T5 (NGK SPARK PLUG CO), published 11 Oct. 2018, each disclose processes and spark plugs where a precious metal electrode is secured on a carrier material by means of a weld bond.

However, a disadvantage of the processes known from the prior art is that the bond between the precious metal electrodes and the carrier at the weld seam has a tendency to corrosion, and there is therefore a need for special protection. Such a process for producing a spark plug by means of a welding method is known, for example, from EP 3694684 A1, in which the weld seam formed is then subjected to an aftertreatment for protection from corrosion.

A further disadvantage of the bonding methods known from the prior art is that, in welding processes, cavities often occur in the weld seam, and these lower the strength of the bond. Moreover, in a weld bond, there is often cracking in the heat-affected zone, which can likewise lower the strength of the weld bond. In practice, it has therefore been found that ignition devices according to the prior art usually have a short lifetime and have a very significant tendency to high wear, severe corrosion and, in many cases, detachment of the precious metal platelet. It is therefore necessary in the prior art to inspect or to change the spark plugs at regular, short time intervals, which leads to high maintenance intensity and frequent shutdown times, which significantly impairs economic operation.

It is likewise disadvantageous that, in the creation of a nonuniform bond between the two materials by means of a weld seam, the two materials are only subjected to point melting and, therefore, warpage and/or internal stresses arise(s) as a result of the nonuniform dissipation of heat introduced along the weld seam or the heat-affected zone. In operation, this leads to nonuniform removal of heat and point overheating of the bonding site, and to mechanical stresses as a result of thermal expansion in the bonding zone, which promotes detachment of the precious metal platelet.

SUMMARY OF THE INVENTION

It is therefore an object of the present invention to provide a process for producing an ignition device that enables a longer lifetime of ignition devices, especially for ignition devices in the form of spark plugs.

This object is achieved, in a process according to the preamble of the independent process for producing an electrode for an ignition device claim, by the characterizing features. What is envisaged in accordance with the invention is that the joining temperature is below the melting temperature of the carrier material and of the electrode material.

If the joining temperature is below the melting temperature of the carrier material and of the electrode material, an exceptional bond between the electrode material and the carrier material is brought about in that diffusion of individual atoms or ions of the materials into the respective other material, for example of the carrier material into the electrode material or vice versa, is brought about. In this way, the diffusion processes result in formation of a particularly strong two-dimensional bond along or within the joining face.

The features of the invention make it possible to establish a bond between the carrier material and the electrode material that has high strength as a result of the two-dimensional bond of the two materials. The two-dimensional bond in the form of a metallic bond further reduces the risk of cracking and the occurrence of corrosion in the joining region and hence specifically unplanned or excessively frequent maintenance intensity, and costs in the renewal of spark plugs or in the exchange of parts are avoided, or costs of the entire ignition device or of a spark plug are reduced. Uniform heating of the joining face also avoids the introduction of thermal stresses into the joining face, such that stress cracks and internal stresses in the two-dimensional bond between the electrode material and the carrier material and warpage of the components are avoided.

The uniform increase in temperature to the joining temperature and the lack of a point or linear melt bath in the joining face, as in the case of melt welding, also makes it possible to better control the supply of heat and hence to make the components, especially the electrode material, smaller or thinner. Since the electrode material in particular consists or may consist of costly precious metals, this leads to a significant reduction in material costs. The process of the invention can thus be used, by contrast with laser welding as known to date from the prior art, to work with thicknesses of the electrode material of below 0.5 mm as well.

Moreover, studies on ignition devices produced by the process of the invention have shown that these have a significantly longer service life compared to the prior art.

In connection with the present invention, joining time is defined as a period of time in which the joining temperature is maintained and/or is greater than or equal to a threshold temperature, especially of 30% of the melting temperature of the carrier material and/or electrode material, where the joining time may also be preceded and/or followed by further temperature profiles at the joining face. For example, there may be a preceding or subsequent heating phase and/or a cooling phase and/or the joining temperature may also be varied within a certain range. The joining temperature in the context of the invention is considered not just to be a constant temperature, but may also be varied during joining time. The joining temperature means that temperature or those temperatures where a bond can be generated between the electrode material and the carrier material. In the course of the studies on which the present invention is based, it was found that, surprisingly, the joining temperature in most of the materials tested is above 30% but below 50% of the melting temperature thereof, especially the melting temperature of the material with the higher melting temperature. Moreover, it was found that higher temperatures can accelerate the bonding process and hence shorten the joining time depending on temperature.

A two-dimensional bond in the context of the present invention means that the carrier material and the electrode material, across the whole joining face, i.e. over the entire area where the carrier material and the electrode material are in contact, form a two-dimensional and uniform bond, especially over the full area, in the form of a metallic bond. The electrodes produced by the production process of the invention thus have subsections bonded in a linear manner as in the case of a weld seam not only at the edge zones of the joining face, but are also bonded to one another two-dimensionally or over the full area and uniformly at least in a majority of the joining face, especially over the entire joining face.

A full-area bond between the electrode material and the carrier material additionally also achieves higher conduction of heat and hence cooler electrodes in use.

Possible spark erosion in ignition devices can occur in an unwanted manner in the edge region of the electrodes, which, in the case of linear bonding, by virtue of restriction thereof to the edge region of the joining face, leads to shortening of the lifetime. By contrast, spark erosion in the case of a two-dimensional bond, as in the case of electrodes produced by the process of the invention, constitutes a negligible effect.

Particularly advantageous embodiments of the process of the invention are defined in detail by the features of the dependent claims:

Preferably, in the process of the invention, the amount of heat which is released to the joining face, especially the carrier material and the electrode material, to raise them to the joining temperature is generated by induction, radiative heat or thermal conduction.

It may preferably be the case that the joining temperature is maintained for a joining time such that a metallic connection based on a metallic bond is formed without formation of intermetallic phases between the carrier material and the electrode material, where the diffusion in particular of atoms and/or ions of the electrode material into the carrier material and/or the diffusion of atoms and/or ions of the carrier material into the electrode material is not less than 0.05 μm, especially between 1 μm and 100 μm, more preferably between 20 μm and 40 μm. The "diffusion bond" achieved brings about a particularly strong metallic bond between the carrier material and the electrode material that does not cause any intermetallic phases between the two materials. Since no intermetallic phases are formed, weakening of the materials or of the bonding between the two materials is also prevented, so as to prevent formation of cracking and cavities and other strength-reducing effects.

"Diffusion" in this connection means the depth to which the atoms and/or ions of the carrier material and/or of the electrode material penetrate into the respective other material. This may also be referred to alternatively as diffusion depth.

It has been found to be advantageous that the carrier material and the electrode material are pressed against one another with a minimum contact pressure of 10 $mN/mm^2$ to 2500 $mN/mm^2$, especially from 100 $mN/mm^2$ to 600 $mN/mm^2$.

In order to be able to effectively prevent the adverse effect of destructive atmospheres and to bring about advantageous formation of the bond at the joining face, it may be the case that the process is conducted under vacuum, under a reduced pressure and/or under a reduced-oxygen, especially oxygen-free, atmosphere and/or under an inert and/or a reducing atmosphere, where the vacuum, the reduced pressure and/or the reduced-oxygen, especially oxygen-free, and/or inert and/or reducing atmosphere is varied in the course of the process.

In an advantageous embodiment, it may be the case that the joining temperature is 30% to 100%, especially 50% to 98%, more preferably 75% to 95%, of the melting temperature of the carrier material and/or of the electrode material.

The two materials can be effectively bonded in a particularly efficient manner in that the joining time after exceedance of the threshold temperature of 30% of the melting temperature of the carrier material and/or of the electrode material is 1 min to 24 h, especially 1 h to 4 h, more preferably 1 h to 2 h. Thus, it may be the case that the joining time is measured only after exceedance of a threshold temperature, or the joining temperature is maintained constantly and/or above the threshold temperature for the joining time.

In an optional embodiment of the process, it may be the case that the joining face has a size of 1 $mm^2$ to 50 $mm^2$, especially 2 $mm^2$ to 30 $mm^2$, more preferably from 2 $mm^2$ to 15 $mm^2$.

The process of the invention makes it possible for the electrode material to have a thickness of 0.05 mm to 2 mm, especially 0.05 mm to 0.5 mm, more preferably from 0.05 mm to 0.25 mm. In this way, by virtue of the particularly thin formation of the electrode material, the positive properties of the electrode material can be implemented at lower material cost.

An effective bond between the two materials is especially provided in that the carrier material consists of a material from element group 4 to 11 or from the titanium, vanadium, chromium, manganese, iron, cobalt, nickel or copper group, especially from the materials nickel, iron, chromium, molybdenum, tungsten or alloys thereof, more preferably VDM Nickel 201 or EN 2.4068, including steels, Inconel and refractory metals, and the electrode material consists of a material from element group 4 to 11 or from the titanium, vanadium, chromium, manganese, iron, cobalt, nickel or copper group, especially from platinum, iridium, rhodium, ruthenium, rhenium or alloys thereof, more preferably from PtRh 90/10 and IrRh 90/10 from Heraeus. "Element group" in the context of the present invention means the respective group of the Periodic Table, which are also referred to as main groups and transition groups, in which all elements in each case have the same number of valence electrons. A definition in accordance with the invention for the term "element group" or "group of the Periodic Table" or else "groups in the Periodic Table of Elements" can be found in a textbook [Handbuch Maschinenbau (Handbook of Mechanical Engineering), Alfred Böge, 2011, ISBN 978-3-8348-1025-0] or Wikipedia.

An optional embodiment of the process of the invention is provided in that a solder material is applied or mounted or introduced on and/or alongside the joining face before or after the positioning of the electrode material on the carrier material, where the joining temperature is above the melting temperature of the solder and in each case below the melting temperature of the carrier material and the electrode material, where the joining time after exceedance of the melting temperature of the solder material is in particular 10 seconds to 2 hours, preferably 1 minute to 60 minutes. The introduction of the solder on and/or alongside the joining face has the effect that the two materials form an advantageous two-dimensional bond via the solder material, and this is reliably maintained even under the action of thermal or internal stresses and ignition forces or when the ignition current is flowing. The joining time in the soldering operation is understood to mean that period of time in which the temperature of the joining face, of the electrode material and/or of the carrier material and/or of the solder material is kept above the melting temperature of the solder.

It is advantageously the case here that the solder base material of the solder material is selected from a material from element groups 9 to 11 or from the cobalt, nickel or copper group or an alloy thereof, where the solder base material of the solder material especially includes alloy additions from element groups 4 to 15, where the solder material especially consists of silver, gold or nickel as solder base material and includes optional additions of for example chromium, silicon, iron, boron, molybdenum, phosphorus, palladium and/or copper or combinations thereof, where the solder material is preferably Ag 99.99 or NiCrSiBFe or NiCrSi.

In an optional embodiment of the process, the carrier material has a depression, where the electrode material when placed against the carrier material is at least partly in a countersunk arrangement in the depression. The formation of depressions or a depression in the carrier material allows the electrode material to be easily positioned, and in this way it is optionally possible to achieve extension of the joining face beyond the lateral edges of the electrode material or carrier material to the lateral faces of the depression.

In a further optional embodiment of the process of the invention, there is an intermediate material disposed atop the carrier material or atop the electrode material, between the carrier material and the electrode material, where the joining face is formed in each case between the carrier material and the intermediate material and the electrode material and the intermediate material, where the joining temperature is below the melting temperature of the carrier material and of the electrode material and of the intermediate material, where the carrier material forms a two-dimensional bond in each case with the intermediate material, and the electrode material with the intermediate material. In this way, it is also possible for materials that otherwise enter into a weak bond with one another to be bonded to one another via the intermediate material, and hence the materials form a two-dimensional bond in the form of a metallic bond with one another via the intermediate material.

It may optionally be the case that the intermediate material takes the form of a diffusion-accelerating material, especially silver or copper, where the diffusion of atoms and/or ions of the electrode material through the intermediate material into the carrier material and/or the diffusion of atoms and/or ions of the carrier material through the intermediate material into the electrode material is accelerated by the intermediate material. By virtue of the intermediate material in the form of or acting as a diffusion accelerator, it is possible to accelerate the diffusion of atoms and/or ions of the electrode material through the intermediate material into the carrier material and/or the diffusion of atoms and/or ions of the carrier material through the intermediate material into the electrode material.

It may optionally be the case that the carrier material and/or the electrode material and/or the intermediate material has an average roughness Ra at the joining face of 0.01 μm to 6.3 μm, especially of 0.02 μm to 0.5 μm. The advantageous surface characteristics of the materials bring about a particularly advantageous, two-dimensional bond between the materials and especially improve diffusion or the diffusion bond.

In order to be able to produce a multitude of electrodes simultaneously, it may be the case that a multitude of carrier materials and electrode materials each form a stacked arrangement in pairs, where the carrier materials to be bonded in pairs and the electrode materials are separated from one another in each case with respect to other pairs by a separating material and/or a separating layer. The separating material or the separating layer does not enter into any bond with the electrode material or carrier material during the process, such that the two materials can each be simply lifted off or detached or separated from the separating material or from the separating layer.

A further aspect of the present invention envisages providing a process for producing a spark plug which, compared to the prior art, has a longer lifetime and a bond of higher strength between the electrode material and the carrier material.

This object is achieved by the characterizing features of the independent process for producing a spark plug claim. According to the invention, it is provided that the bond between the carrier and the electrode platelet is established by a process by the process of the invention.

The process of the invention for producing the spark plug can be performed easily and inexpensively and, in this way, a strong two-dimensional bond protected against corrosion and cracking can be established between the electrode platelet and the carrier.

A further aspect of the present invention envisages providing a spark plug, especially for internal combustion engines or gas engines, having an electrode of the invention or an electrode consisting of an electrode material having a particularly good bond to the carrier material.

This object is achieved in a spark plug according to the preamble of the independent spark plug claim by the characterizing features. What is envisaged in accordance with the invention is that the bond between the carrier and the electrode platelet is established by a process of the invention, wherein the carrier takes the form of the carrier material and the electrode platelet takes the form of the electrode material.

The spark plug of the invention has a particularly strong bond between the carrier and the electrode that is protected against adverse effects that occur in the ignition process, and so this can also be used with a long lifetime and high reliability in the case of use as a high-performance spark plug, where a high electrical potential difference occurs and, at the same time, high thermal durability is required. The spark plug of the invention here is able to withstand high electrical potential differences and, at the same time, high thermal stresses or cycling stresses.

An advantageous embodiment of the spark plug of the invention can be provided in that the carrier is formed from a titanium, nickel or iron material, especially from a nickel or chromium-nickel alloy or steel or Inconel or a refractory metal, preferably from nickel in pure form, nickel base alloys, FeCrNi or FeCrNiMo stainless steels, and where the electrode platelet is formed from a precious metal, especially platinum, iridium, rhodium, ruthenium, rhenium or an alloy thereof, especially platinum/rhodium, platinum/rhenium, platinum/iridium, iridium/rhenium or iridium/rhodium alloys, where the electrode platelet more preferably includes an alloy composed of PtRh 90/10 or an alloy composed of IrRh 90/10 and the carrier includes an alloy of VDM Nickel 201 or EN 2.4068.

A further aspect of the invention envisages providing an ignition device having an advantageous bond between the carrier and the electrode platelet. This object is achieved by the characterizing features of the independent ignition device claim; according to the invention, it is provided that the carrier and the electrode platelet form a two-dimensional, uniform connection with one another, especially over the full area, where, in particular, the carrier takes the form of the carrier material and the electrode platelet takes the form of the electrode material, where a diffusion zone is formed in the region of the two-dimensional bond between the carrier and the electrode platelet, in which there is a concentration of the material of the carrier proceeding from the carrier in the direction of the electrode platelet from 100% to 0% and a concentration of the material of the electrode platelet proceeding from the carrier (in the direction of the electrode platelet) from 0% to 100%, where, in particular, the diffusion depth is not less than 0.05 μm, especially between 1 μm and 100 μm, more preferably between 20 μm and 40 μm.

It is preferably the case that the carrier is formed from a titanium, nickel or iron material, especially from a nickel or chromium-nickel alloy or steel or Inconel or a refractory metal, preferably from nickel in pure form, nickel base alloys, FeCrNi or FeCrNiMo stainless steel, and where the electrode platelet is formed from a precious metal, especially platinum, iridium, rhodium, ruthenium, rhenium or an alloy thereof, especially platinum/rhodium, platinum/rhenium, platinum/iridium, iridium/rhenium or iridium/rhodium alloys, where the electrode platelet more preferably includes an alloy composed of PtRh 90/10 and/or the electrode platelet includes an alloy of IrRh 90/10 and the carrier includes an alloy of VDM Nickel 201 or EN 2.4068.

Further advantages and configurations of the invention will be apparent from the description and the appended drawings.

The invention is illustrated schematically hereinafter in the drawings by working examples that are particularly advantageous but should not be considered to be limiting, and is described by way of example with reference to the drawings.

BRIEF DESCRIPTION OF THE FIGURES

FIG. 1 shows an electrode produced by the process of the invention in a schematic diagram, FIGS. 1*a* to 1*d* show different temperature-time diagrams of production processes for an electrode of the invention in a simplified diagram, FIG. 2 shows an electrode produced by means of a solder in a schematic diagram, FIG. 3 shows an electrode with an intermediate material, FIG. 4 shows a schematic view of an electrode with a depression.

DETAILED DESCRIPTION OF THE INVENTION

Figure 1B:
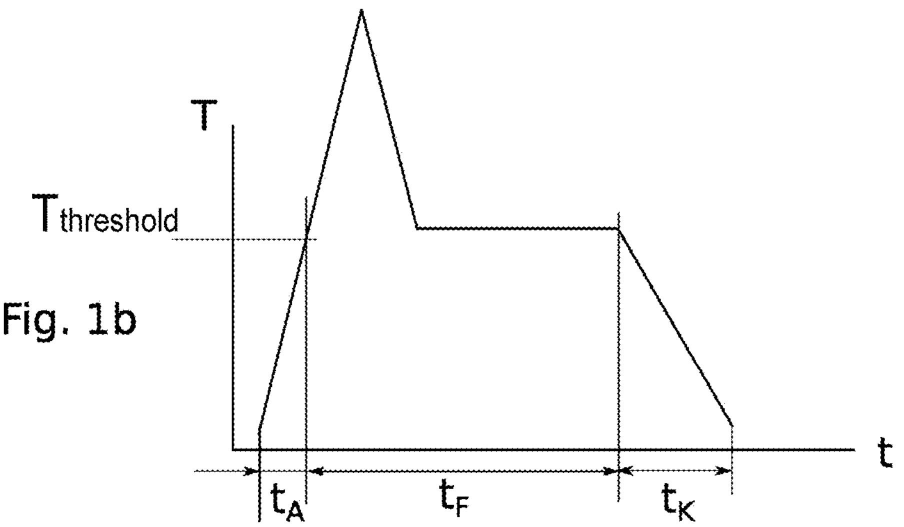

FIG. 1 depicts a first electrode of the invention for an ignition device in a schematic diagram. The electrode has a metallic carrier material 1 bonded to a likewise metallic electrode material 2 at a joining face 8. The electrode shown in FIG. 1 was produced by the process of the invention. For production of the electrode, the metallic electrode material 2 was placed against the metallic carrier material 1 at a joining face 8 such that it adjoins the carrier material 1 in a two-dimensional manner. The carrier material 1 and the electrode material 2 are pressed against one another with a defined contact pressure at the joining face 8 and positioned in a chamber in which a reduced pressure, a vacuum and/or a defined atmosphere can be generated. After positioning of the carrier material 1 and the electrode material 2, a reduced pressure or a defined atmosphere is applied in the chamber. After application of the defined atmosphere or of the reduced pressure, the joining face 8 is heated to a joining temperature $T_F$, and this is maintained over a defined joining time $t_F$. The pressing of the electrode material 2 against the carrier material 1 and the heating to the joining temperature $T_F$ bring about a two-dimensional bond of the carrier material 1 to the electrode material 2. The joining temperature $T_F$ in the process of the invention is below the melting temperature $T_S$ of the carrier material 1 and below the melting temperature $T_S$ of the electrode material 2.

The electrode shown in FIG. 1 was produced by what is called a diffusion bonding operation, where the joining temperature $T_F$ is always below the melting temperature $T_S$ of the carrier material 1 and below the melting temperature $T_S$ of the electrode material 2. The joining temperature $T_F$ is maintained for the joining time $t_F$, such that a metallic connection in the form of a metallic bond is formed without formation of intermetallic phases between the carrier material 1 and the electrode material 2. The maintaining of the joining temperature $T_F$ for a joining time $t_F$ has the effect that atoms and/or ions of the electrode material 2 penetrate into the carrier material 1, or vice versa. This "diffusion effect" was surprisingly found in experiments that form the basis of the present invention. It was found here that atoms or ions, depending on the material pair, of the electrode material 2 diffuse into the carrier material 1 and/or vice versa and reach a diffusion depth $d_F$ of at least 0.05 μm or more.

As shown in the diagram of FIG. 1*a*, after the electrode material 2 has been placed against the carrier material 1 and the reduced pressure or the atmosphere has been applied, the joining face 8 or the overall carrier material 1 and the overall electrode material 2 are heated. After a heating time $t_A$, the joining temperature $T_F$ is attained and then maintained for the joining time $t_F$. The joining time $t_F$ is maintained for between 1 second and 24 hours, where the joining time $t_F$ is especially between 1 h and 4 h, more preferably between 1 h and 2 h. On conclusion of the joining time $t_F$, the heating process is then ended, and the joining face 8 or the electrode material 2 and the carrier material 1 are then cooled down for a cooling time $t_K$. According to the invention, the joining temperature $T_F$ is 27 between 30% and 100% of the melting temperature $T_S$ of the carrier material 1 and/or of the electrode material 2, especially between 50% and 98%, more preferably between 75% and 95%, of the melting temperature $T_S$ of the carrier material 1 and/or of the electrode material 2. For example, according to the material pairing, the joining temperature $T_F$ may therefore be 77% of the melting temperature of the carrier material 1 and 45% of the melting temperature $T_S$ of the electrode material 2.

FIG. 1*b* depicts a further diagram of a possible heating curve. The temperature T is increased proceeding from a starting temperature of, for instance, room temperature over a heating time $t_A$ up to a threshold temperature $T_{threshold}$. On attainment of the threshold temperature $T_{threshold}$, the joining time $t_F$ commences, in which the temperature is increased further, for example up to the melting temperature $T_S$ of one of the two materials or else higher, and is then lowered again. The temperature T of the materials is then kept constant for a period of time and then lowered again after the bond has been formed for a cooling time $t_K$.

Figure 1C:
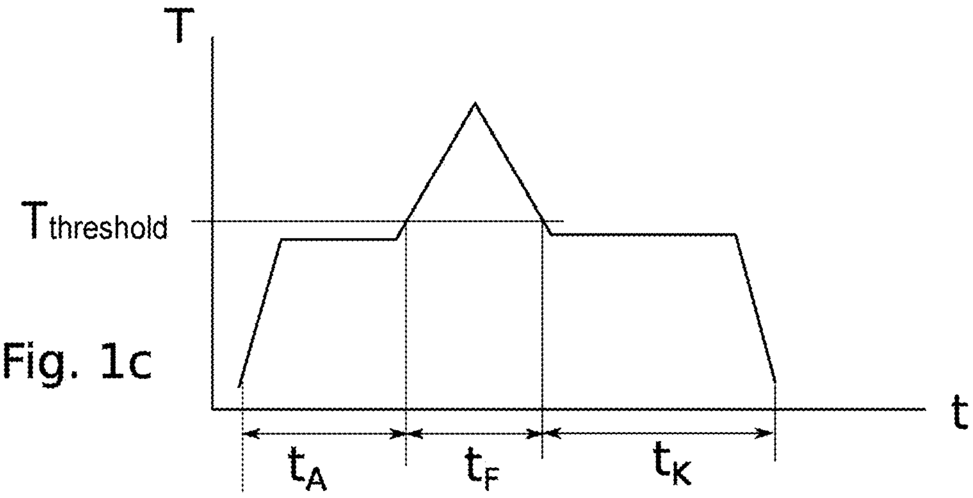
Figure 1D:
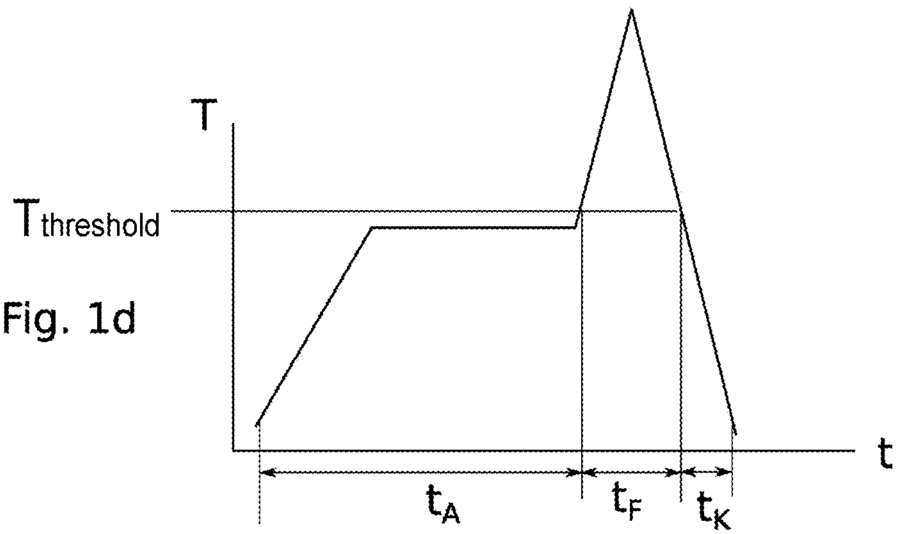

As shown in FIGS. 1*c* and 1*d*, the joining temperature $T_F$ may also optionally be made variable exclusively in the form of a ramp above the threshold temperature $T_{threshold}$, or else first kept constant over a period of time and then increased and/or lowered further.

The joining temperature $T_F$ is in each case that temperature which lies above the threshold temperature $T_{threshold}$ and at which the electrode material 2 and the carrier material 1 begin to form a bond. The joining temperature $T_F$ may be constant as shown in FIG. 1*a*, or may be variable over the joining time $t_F$ as shown in FIGS. 1*b* to 1*d*.

For formation of the two-dimensional bond between the carrier material 1 and the electrode material 2, in the production process for the electrode, the two materials are pressed against one another with a defined contact pressure at the joining face 8. According to the invention, it has been found that a minimum contact pressure of 10 $mN/mm^2$ to 2500 $mN/mm^2$, especially from 100 $mN/mm^2$ to 600 $mN/mm^2$, has an advantageous effect on the bonding properties of the carrier material 1 to the electrode material 2.

In particular, depending on the materials used in the electrode material 2 and the carrier material 1, the process can be conducted under vacuum, a reduced pressure and/or a reduced-oxygen, especially oxygen-free, atmosphere. The atmosphere applied may optionally also be inert or a reducing atmosphere. The joining face 8 in the process of the invention for production of an electrode preferably has a size of 1 $mm^2$ to 50 $mm^2$, especially of 2 $mm^2$ to 30 $mm^2$, more preferably of 2 $mm^2$ to 15 $mm^2$.

FIG. 2 shows a further embodiment of the electrode of the invention that has been produced by a second embodiment of the production process of the invention. For bonding of the carrier material 1 and the electrode material 2, a solder material 13 is additionally applied to the joining face 8 or placed alongside the joining face, and the joining temperature $T_F$ is then increased above the melting temperature $T_S$ of the solder and below the melting temperature $T_S$ of the carrier material 1 and of the electrode material 2. The applying of the solder material 13 and the increasing of the joining temperature $T_F$ above the melting temperature $T_S$ of the solder material 13 have the effect that, especially under reduced pressure or a vacuum, the solder material 13 melts and, by virtue of capillary effects, is pulled into the joining face 8 or between the electrode material 2 and the carrier material 1, and hence a two-dimensional bond is formed between the electrode material 2 and the carrier material 1. It has been found that, surprisingly, during the forming of the bond by means of solder material 13, a fraction of atoms and/or ions of the electrode material 2 and/or of the carrier material 1 can optionally likewise penetrate through the solder material 13 or across the joining face 8 into the respective other material and improve the bond.

The solder material 13, or the solder base material, is preferably selected from a material of element groups 9 to 11 or from the cobalt, nickel or copper group or an alloy thereof. The solder base material especially includes alloy additions from element groups 4 to 15, preference being given in particular to silver, gold or nickel as solder base material and additions of chromium, silicon, boron, iron, molybdenum, phosphorus, palladium and/or copper and/or combinations thereof.

FIG. 3 depicts a further electrode produced by an optional embodiment of the process of the invention in schematic view. Between the electrode material 2 and the carrier material 1 is disposed an intermediate material 12 that has been positioned before the temperature has been increased to the joining temperature $T_F$. The intermediate material 12 may be inserted at the joining face 8 between the carrier material 1 and the electrode material 2, such that the joining face 8 is formed in each case between the carrier material 1 and the intermediate material 12, and the electrode material 2 and the intermediate material 12. After application of the defined atmosphere and/or vacuum or reduced pressure, the temperature in the joining face 8 or the temperature of the intermediate material 12, of the carrier material 1 and of the electrode material 2 is then increased to the joining temperature $T_F$, in which case the joining temperature $T_F$ is then below the melting temperature $T_S$ of the carrier material 1 and below the melting temperature $T_S$ of the electrode material 2 and below the melting temperature $T_S$ of the intermediate material 12. After the joining temperature $T_F$ has been maintained over the joining time $t_F$, a two-dimensional bond is then formed in each case between the carrier material 1 and the intermediate material 12, and a two-dimensional bond between the electrode material 2 and the intermediate material 12. It may optionally also be the case that atoms or ions of the electrode material 2 diffuse through the intermediate material 12 into the carrier material 1, and/or atoms or ions of the carrier material 1 diffuse through the intermediate material 12 into the electrode material 2.

The intermediate material 12 may optionally also take the form of a diffusion accelerator, in which case the intermediate material especially consists of or comprises a thin layer of copper or silver. The intermediate material 12 in the form of a diffusion accelerator can accelerate the diffusion of atoms and/or ions of the electrode material 2 through the intermediate material 12 into the carrier material 1 and/or the diffusion of atoms and/or ions of the carrier material 1 through the intermediate material 12 into the electrode material 2. It has thus been found that, surprisingly, a thin layer of silver in a thickness of 100 nm, diffusion in the case of a joining temperature $T_F$ around about 95% of the melting temperature of the silver material, accelerated diffusion by a factor of 40.

FIG. 4 shows a depression 11 formed in the carrier material 1, into which the electrode material 2 is in a partly countersunk arrangement when placed against the carrier material 1. This may optionally extend the joining face 8 beyond the edge of the electrode material 2 and optionally facilitate the positioning of the electrode material 2 on the carrier material 1, and contribute to elevated strength of the bond in the joining face 8. Alternatively, the depression 11 or the introduction of the electrode material 2 into the carrier material 1 may also occur spontaneously during the production process. To wit, it is suspected that, especially in the case of diffusion processes, the penetration of the atoms or ions of the electrode material 2 into the carrier material 1 brings about partial penetration of the overall electrode material 2 into the carrier material 1, and a depression 11 can be formed in this way.

Figure 18:
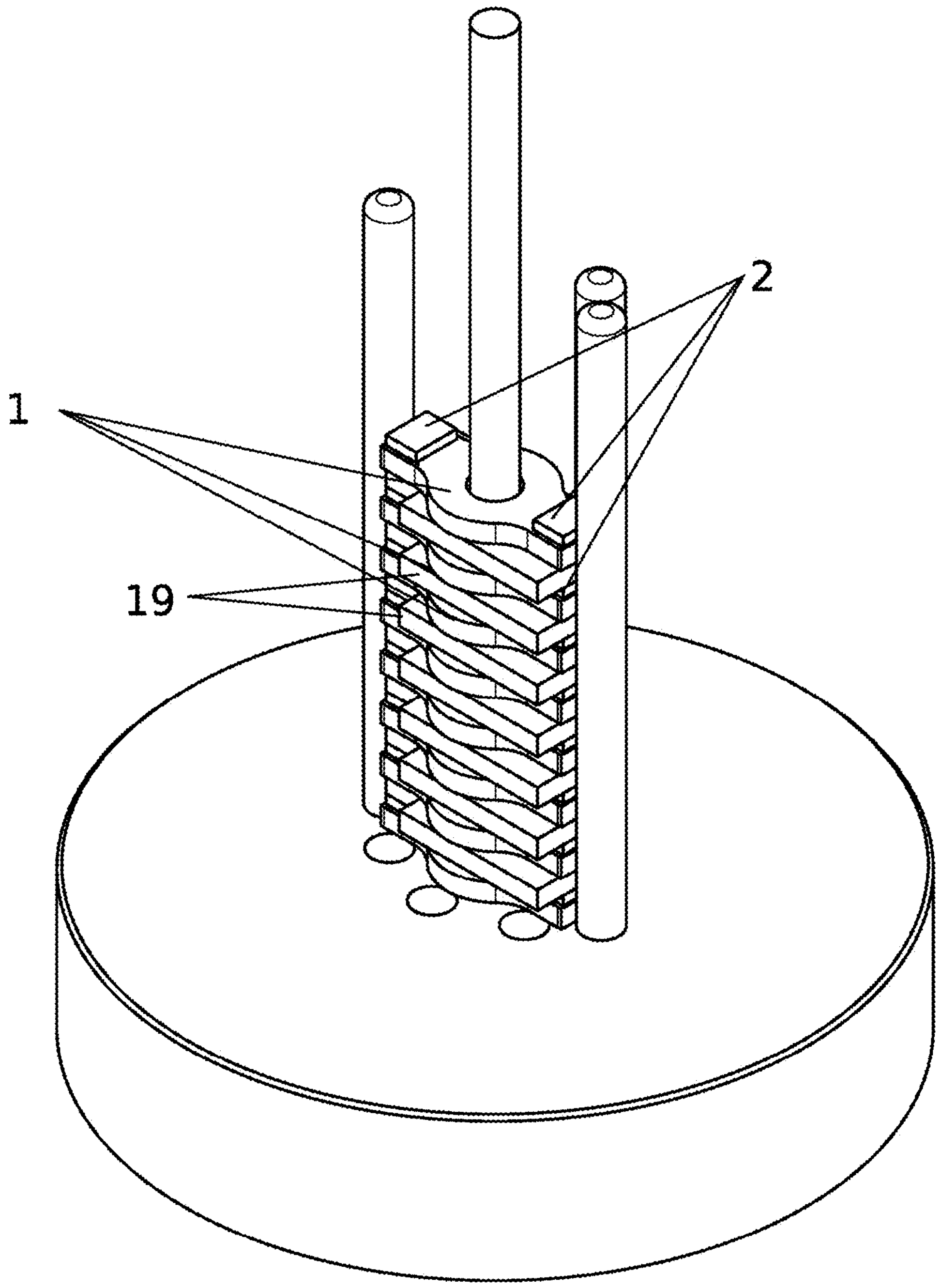
FIG. 18 shows an embodiment of the production process of the invention for production of multiple electrodes.

In a further embodiment of the process of the invention as shown in FIG. 18, a multitude of carrier materials 1 and electrode materials 2 are positioned collectively in the chamber for application of the defined atmosphere and/or vacuum or reduced pressure. In this case, a carrier material 1 is placed against an electrode material 2 in each case, and the resultant paired arrangements are each stacked, for example, or positioned at a distance from one another. The carrier materials 1 and the electrode materials 2 to be bonded in pairs may each be separated from one another by a carrier material 19 or a separating layer. The carrier material 19 is a material that does not bond either to the electrode material 2 or to the carrier material 1, or prevents bonding of carrier materials 1 and electrode materials 2 to respective other materials arranged in pairs.

Figure 5:
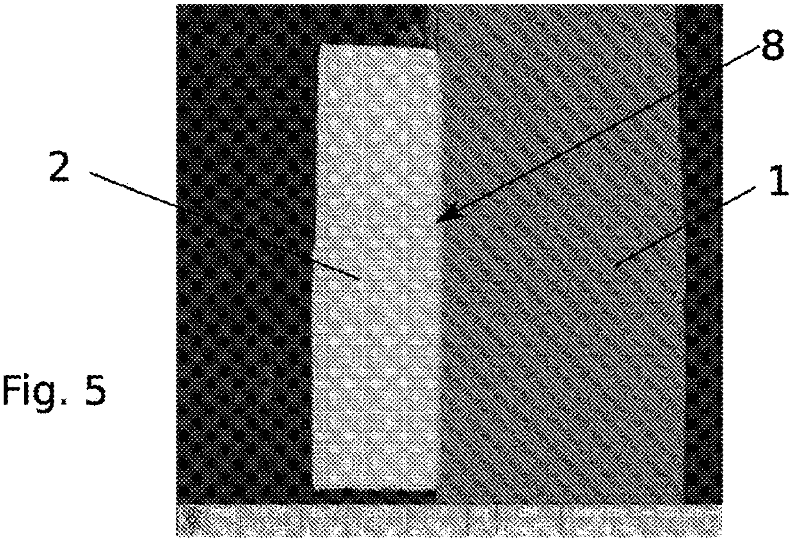
FIG. 5 shows an image of an electrode of the invention under an electron microscope (FEI Quanta 3D 200 scanning electron microscope)

FIG. 5 shows an image of the joining face 8, with a magnification factor of 70:1, which was recorded by means of an electron microscope of the FEI Quanta 3D 200 scanning electron microscope type, of an electrode produced by the process of the invention. The electrode has a carrier material 1 on which the electrode material 2 has been placed against the joining face 8, and a two-dimensional bond has been formed by means of the process of the invention. The electrode material 2 has dimensions of 1.7 mm×2.2 mm and a thickness of 0.5 mm. The electrode material 2 consists of the platinum-rhodium alloy PtRh 90/10 from Heraeus. The carrier material 1 in this embodiment consists of the nickel alloy VDM Nickel 201, also known as EN 2.4068.

Figure 6:
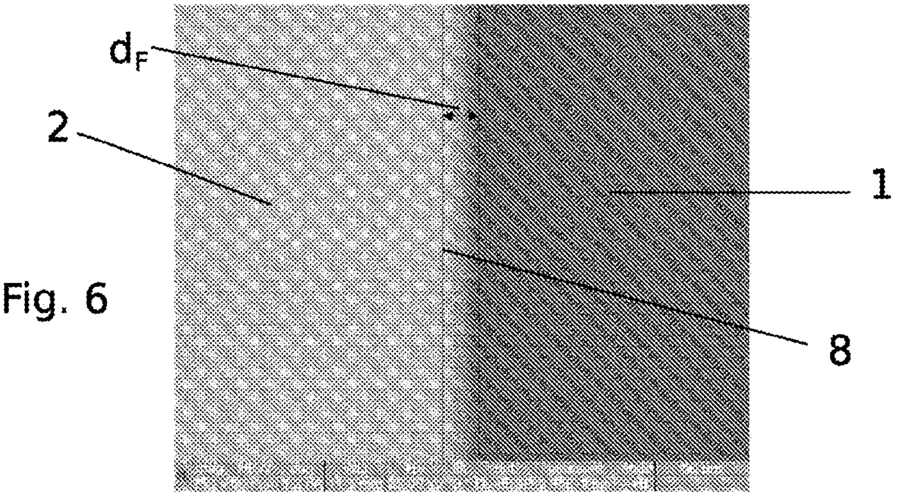
FIG. 6 shows a further image under an electron microscope with higher magnification as per FIG. 5.

FIG. 6 shows an enlarged image of the joining face 8 of the electrode according to FIG. 5 in elevated resolution (1024×943 @96 dpi, bit depth 24, magnification factor of 250:1). It is apparent at the joining face 8 that, as a result of the process of the invention, atoms or ions of the electrode material 2 have diffused into the carrier material 1. The diffusion depth $d_F$, i.e. the maximum distance that an atom or ion of the electrode material 2 has penetrated into the carrier material 1, is 36.8 μm. The diffusion depth de has been determined with reference to the image taken by the electron microscope on the basis of the different contrast or different gray color at the joining face 8. This was done using the method of energy-dispersive x-ray spectroscopy (EDX) from EDAX in combination with a solid state backscattered electron imaging system (SSBSED) and an ETD (secondary electron detector).

Figure 7:
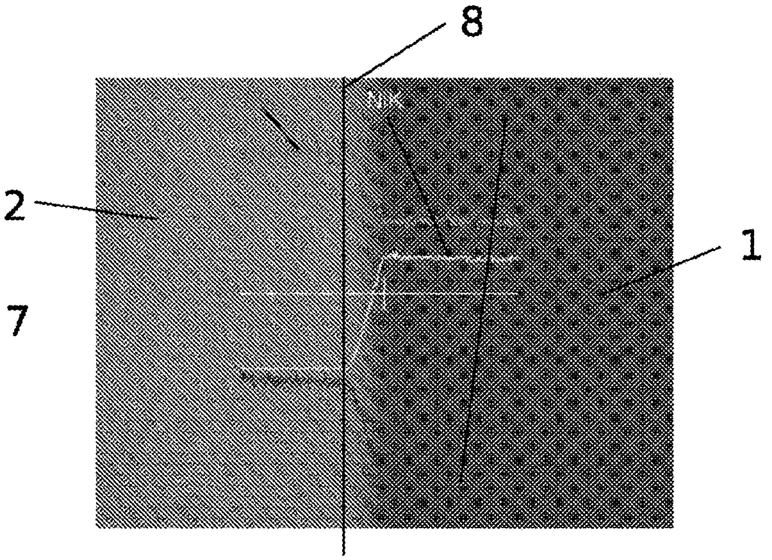
FIG. 7 shows the distribution of the individual elements in the region of the joining face of an electrode as per FIGS. 5 and 6.

FIG. 7 shows a representation of the analysis of the progression of the material concentration of the electrode material 2 and of the carrier material 1 at the joining face 8. The concentration of the individual elements obtained in FIG. 7 by the energy-dispersive x-ray (EDX) measurement shows that both rhodium (indicated as "RhL" via the intensity of the rhodium L line) and platinum (identified as "PtL" via the intensity of the platinum L line) have penetrated into the nickel material (identified as "NIK" via the intensity of the nickel K line) of the carrier material 1 proceeding from the original joining face 8 with falling concentration. Proceeding from the joining face 8, a diffusion region is formed, in which both nickel atoms or ions and rhodium and platinum ions or atoms are present in falling concentration along the diffusion depth $d_F$ from the original joining face 8 in the direction of the carrier material 1. FIG. 5 to FIG. 7 show the effect that is surprisingly achieved by the production process of the invention, that a diffusion zone is formed proceeding from the joining face 8, in which atoms or ions of the electrode material 2 penetrate into the carrier material 1 and hence a two-dimensional bond is formed between the carrier material 1 and the electrode material 2.

Figure 8:
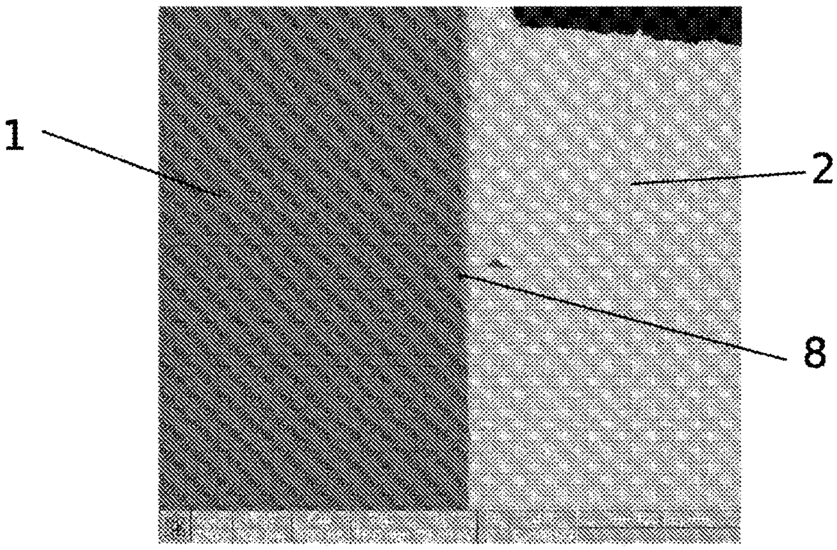
FIG. 8 shows a further image under an electron microscope of an embodiment of an electrode of the invention.
Figure 9:
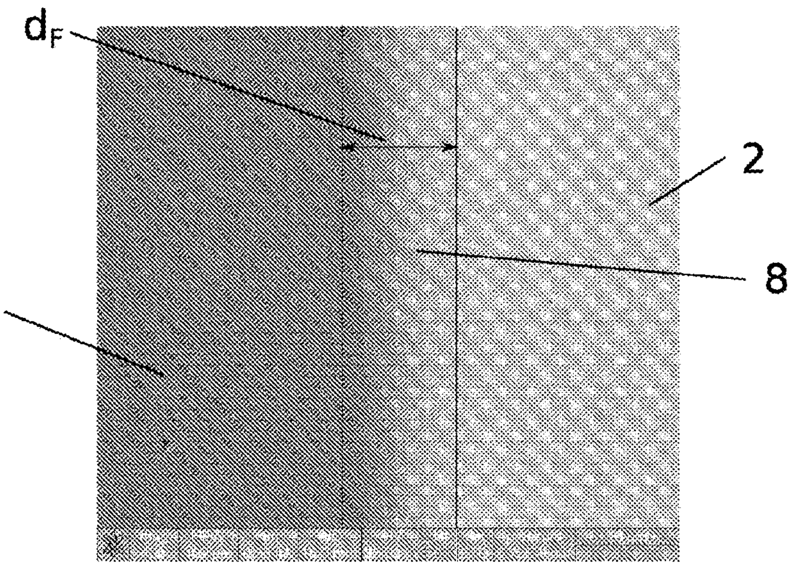
FIG. 9 shows an image of the electrode according to FIG. 8 in higher magnification.
Figure 10:
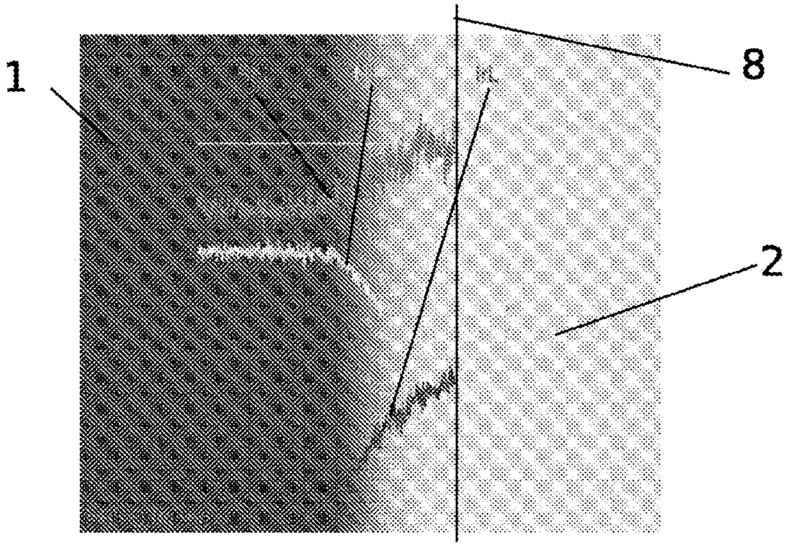
FIG. 10 shows the distribution of the elements in the region of the joining face of an electrode as per FIGS. 8 and 9.

FIG. 8 to FIG. 10 show further electron microscope images of a bond between the carrier material 1 and the electrode material 2 in an alternative embodiment. The carrier material 1 consists of the nickel alloy VDM Nickel 201, also known as EN 2.4068, and the electrode material 2 of an iridium-rhodium alloy IrRh 90/10 from Heraeus. As apparent in FIG. 8 to FIG. 10, a diffusion zone is formed at the joining face 8, in which ions or atoms of the electrode material 2 have diffused into the carrier material 1. The measured diffusion depth $d_F$ is 22.5 μm (FIG. 9). FIG. 8 shows an image of the joining face 8 with a resolution of 1024×943 @96 dpi, bit depth 24 and a magnification factor of 250:1, and FIG. 9 shows a resolution of 1024×943 @96 dpi, bit depth 24, with a magnification factor of 1400:1.

FIG. 10 shows a schematic of the concentration profile of the individual atoms or ions of the individual materials of the carrier material 1 and the electrode material 2. Proceeding from the joining face 8 in the direction of the carrier material 1, the concentration of rhodium and iridium decreases and the nickel concentration rises. Proceeding from the joining face 8, a region is thus formed in the diffusion zone in which rhodium atoms (identified as "RhL" via the intensity of the rhodium L line), iridium atoms (identified as "IrL" via the intensity of the iridium L line) and nickel atoms (identified as "NiK" via the intensity of the nickel K line), or ions, are present and form a two-dimensional bond of the two materials in the diffusion region.

Figure 11:
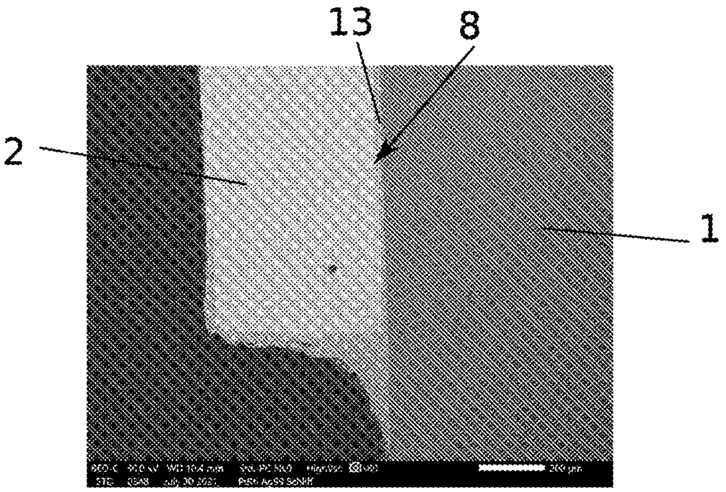
FIG. 11 shows an image under an electron microscope (JEOL-JSM-IT200-LA with EDX unit) of an electrode of the invention produced by soldering.

FIG. 11 shows an alternative embodiment of the electrode that has been produced by means of an optional production process with the aid of a solder material 13. At the joining face 8 is disposed, between the carrier material 1 and the electrode material 2, a solder material 13 that has been applied to the joining face 8 during the production process. The application of the solder established a two-dimensional bond between the carrier material 1 and the electrode material 2 via the solder material 13. As apparent in FIG. 11, electrodes produced by means of solder likewise have a reliable, two-dimensional bond between the carrier material and the electrode material 2. The solder material 13, in the creation of the two-dimensional bond between the electrode material 2 and the carrier material 1, May optionally be applied before or after the positioning of the electrode material 2 on the carrier material 1, or be introduced into the joining face 8 or placed at the edge of or alongside the joining face 8 during the joining process. In the electrode produced by means of solder as shown in FIG. 11, the electrode material 2 consists of PtRh 90/10 and the carrier material 1 of VDM Nickel 201 or EN 2.4068. The solder material 13 consists of a silver solder, in this embodiment Ag 99.99 silver. The electrode material 2 was placed against the carrier material 1 with a contact pressure of 65 $mN/mm^2$, and the solder material 13 was applied to the joining face. The arrangement was positioned under ambient atmosphere and, after evacuation down to a vacuum of $8\times10^{-5}$ mbar (v line in FIG. 11*b*), the heating process was started. On attainment of a temperature of 650° C., an argon atmosphere at 10 mbar (p line in FIG. 11*b*) was applied.

Figure 11A:
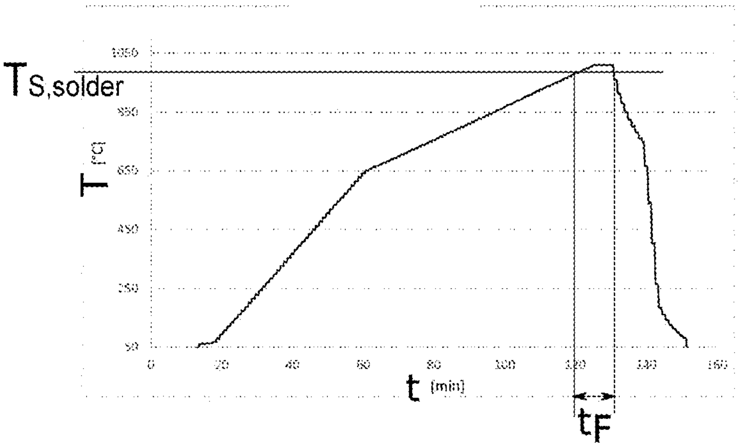
FIG. 11*a* shows the temperature progression of the production process for the electrode depicted in FIG. 11.
Figure 11B:
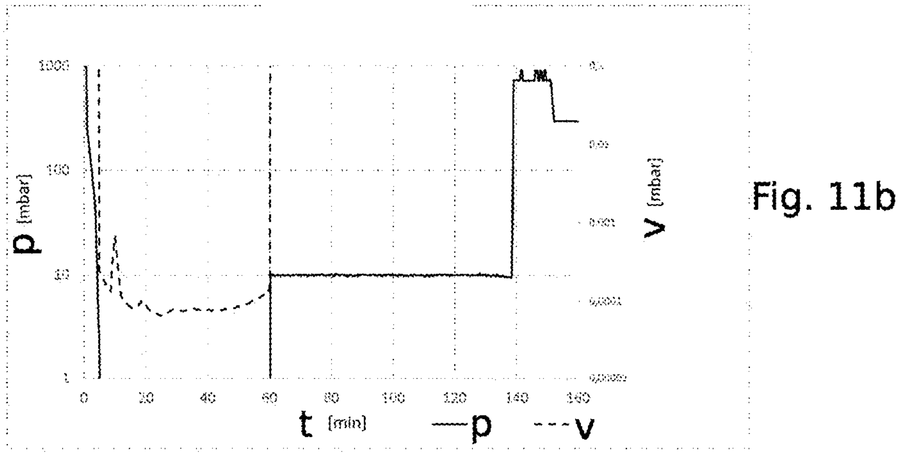
FIG. 11*b* shows the pressure progression and the vacuum conditions of the production process for the electrodes depicted in FIG. 11.

The temperature profile of the heating process shown in FIG. 11*a* was configured such that the positioned arrangement was heated up proceeding from room temperature to 650° C. within 50 minutes and further at 6° C./minute to a temperature of 1010° C. for a hold time of 5 minutes, and subsequently cooled down to room temperature. This results in a joining time $t_F$ of 14 min from the temperature going above to going below the melting temperature $T_{S,solder}$ of the solder material 13 of about 960° C. The melting temperature $T_{S,solder}$ of the solder material 13 was thus exceeded, and that of carrier material 1 and of the electrode material 2 was not attained. After a cooling process, the section was then created and subjected to an examination with an electron microscope of the JEOL-JSM-IT200-LA type with EDX unit under high vacuum. The image obtained from the examination by the electron microscope is depicted as FIG. 11 with a magnification factor of 80:1.

The section shown in FIG. 11 was created by an abrasive process using Struers films (grain sizes 220, 500, 800, 1000, 1200) for about 1 minute each, fine grinding on MD Largo with DiaPro Largo 9μ for about 5 minutes, polishing on MD Floc with DiaPro Floc 3μ for about 3 minutes, and final polishing on MD Nap with Diapro Nap 1μ for about 3 minutes.

Figure 12:
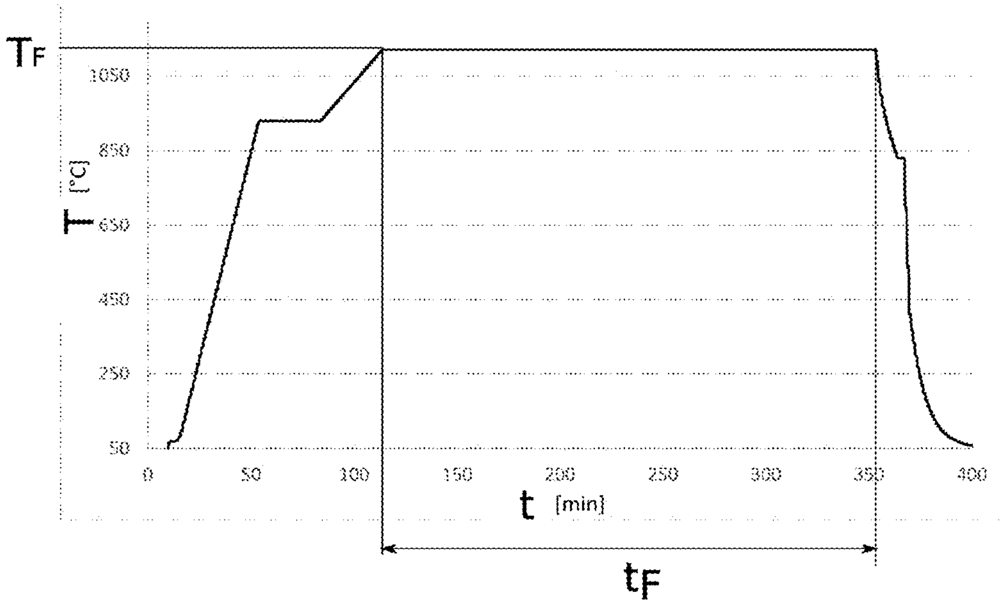
FIG. 12 shows a diagram of the temperature progression of one embodiment of the production process for an electrode as per FIG. 5 to FIG. 10.
Figure 13:
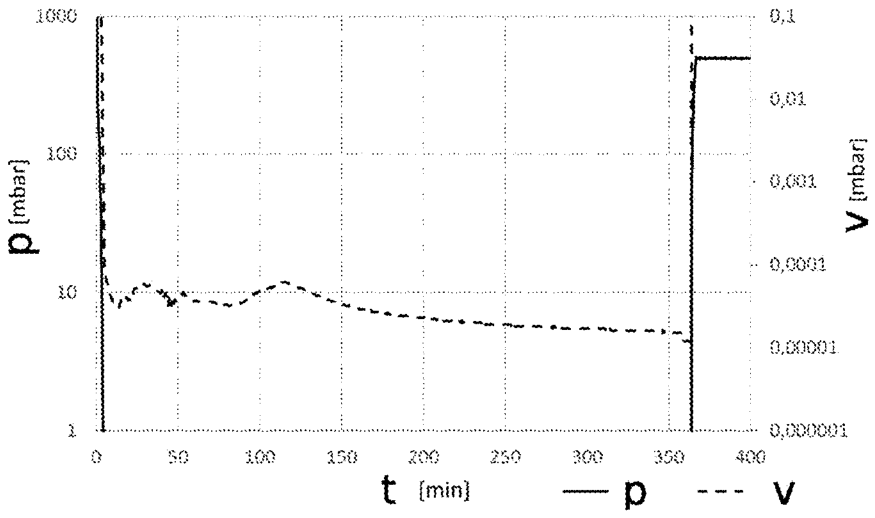
FIG. 13 shows a diagram of the pressure progression and the vacuum conditions of the embodiment of the production process of the invention as per FIG. 12.

FIG. 12 shows the temperature profile of a production process of the invention for a two-dimensional bond between the carrier material 1 and the electrode material 2. In this embodiment, the electrode material 2 consists of the palladium-rhodium alloy Pt/Rh 90/10, and the carrier material 1 of the nickel material VDM Nickel 201 or EN 2.4068. The electrode material 2 was placed against the carrier material 1 at the joining face 8 and then pressed onto the carrier material 1 at a contact pressure of 310 $mN/mm^2$. The two materials placed against one another were then positioned in a chamber for application of a reduced pressure or vacuum of the MOV 643 type from PVA, and a vacuum of $1\times10^{-5}$ mbar, recognizable by the v line in FIG. 13, was applied. After the vacuum had been applied, the temperature in the chamber was then raised, proceeding from room temperature, to a temperature hold level of 930° C. within 40 min and, after 30 min, further to 1120° C. within a period of time of 30 min. The temperature was applied to the materials by thermal radiation using molybdenum heating elements. After the electrode had been cooled down, it was then removed and subjected to electron microscope 11 examinations with an FEI Quanta 3D 200 scanning electron microscope. Before examination by the electron microscope, the electrode was subjected to processing to give a section, and then examined with the electron microscope. For this purpose, the electrode was embedded by the hot embedding method, divided at right angles to the joining face by the wet division method, polished with the aid of diamond suspension and analyzed under high vacuum by the EDX method. The results of the examination, in which the diffusion depth attained by the platinum and rhodium atoms or ions of 36.8 μm was found, are shown in FIGS. 5 to 7.

The electrode shown in FIG. 8 to FIG. 10 was produced together with the electrode shown in FIGS. 5 to 7 in accordance with the production process described beforehand with regard to FIG. 12 in a common operation. The arrangement was positioned under ambient atmosphere. After the chamber had been evacuated to a vacuum of $5\times10^{-5}$ mbar (v line in FIG. 13), heating was undertaken up to a hold temperature of 930° C. After a hold time of 30 minutes, the heating was continued at 6.3° C./min, up to the joining temperature of 1120° C., and, after a hold time of 4 h, cooled down to 830° C. under vacuum ($1\times10^{-5}$ mbar) and further to room temperature under a nitrogen atmosphere at 500 mbar (p line in FIG. 13). The hold time of 4 h at 1120° C. corresponds to the joining time $t_F$ of 4 h; the joining temperature of 1120° C. corresponds to 77% $T_S$ of VDM Nickel 201 or EN 2.4068 and 60% $T_S$ of PtRh 90/10 from Heraeus and about 45% $T_S$ of IrRh 90/10 from Heraeus. The electrode was likewise embedded by the hot embedding method, divided at right angles to the joining face by the wet division method, polished with the aid of diamond suspension and analyzed under high vacuum by the EDX method. The images created in the electron microscope examination are shown in FIG. 8 to FIG. 10, with achievement of a diffusion depth de of 22.5 μm of the atoms or ions of iridium and rhodium into the nickel material of the carrier material 1.

Figure 14:
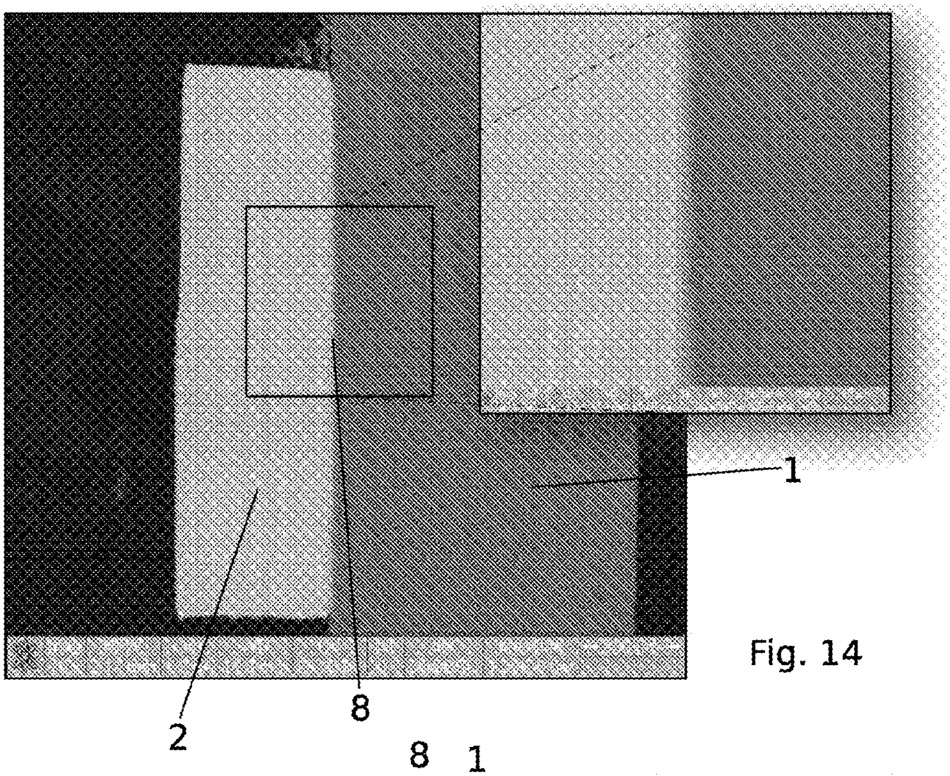
FIG. 14 shows an image of a section of an electrode of the invention.
Figure 15:
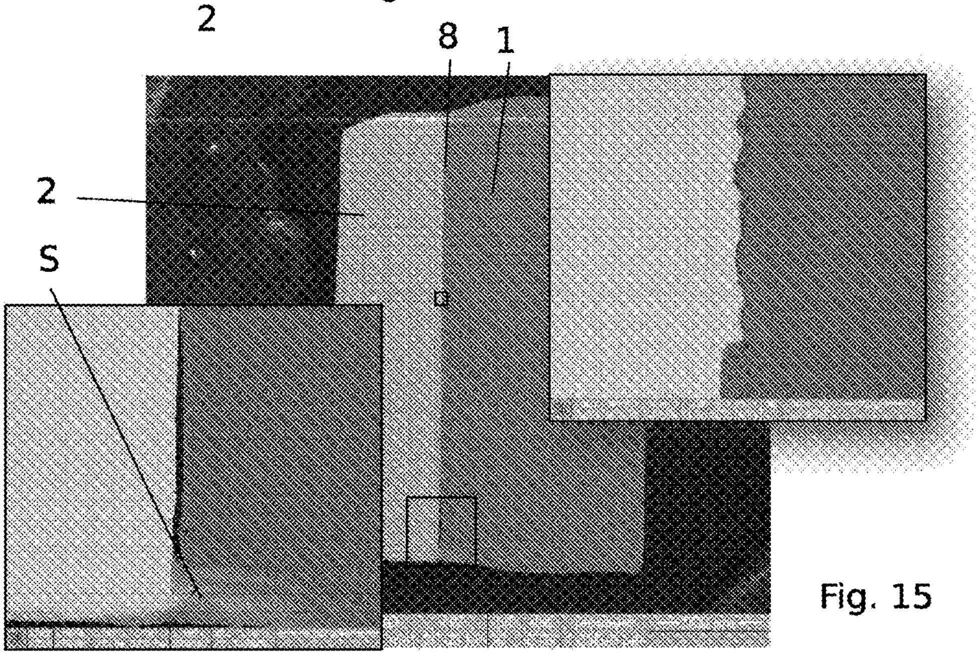
FIG. 15 shows an image of a section of an electrode of a spark plug from the prior art.

FIG. 14 and FIG. 15 depict a comparison between an electrode produced by the process of the invention (FIG. 14) and an electrode produced by a laser welding method known from the prior art (FIG. 15, IrRh 90/10 electrode platelet on nickel carrier from Bosch, produced by laser beam welding). As apparent in FIG. 14, the electrodes produced by the production process of the invention form a full-area bond free of cracks and cavities between the electrode material 2 and the carrier material 1, and a firm and permanent bond is achieved between the two materials. As apparent in FIG. 15, the electrodes known from the prior art do not form a full-area bond between the carrier material 1 and the electrode material 2, but have a clear material boundary at the joining face 8. As shown in enlarged form in the lower left-hand box in FIG. 15, the electrodes known from the prior art likewise have a bond merely in the region of the linear weld seam S, but do not have a bond between the carrier material 1 and the electrode material 2 in the region of the joining face 8 that extends beyond the edge zones thereof. Thus, no bond between the carrier material 1 and the electrode material 2 is achieved within the interior of the sample outside the weld zone, which projects about 50 μm to 100 μm into the interior of the sample. It is likewise apparent in FIG. 15 that the electrodes known from the prior art have defects resulting from the mechanical contact pressure of the materials (upper right-hand box, FIG. 15), where there is elevated propensity to corrosion according to studies.

In the comparison of FIGS. 14 and 15, in the analyses by examinations with an electron microscope and further examinations of spent electrodes, it was found that the production process of the invention achieves a full-area bond of the carrier material 1 to the electrode material 2, which, by contrast with the prior art, brings about higher strength and hence longer lifetime of the spark plugs or ignition devices produced from the electrodes. A uniform, full-area bond between the electrode material and the carrier material by the process of the invention also achieves better heat transfer or higher conduction of heat than the prior art and hence improved removal of heat from electrodes in use, and the bonding zone, moreover, is hidden from spark erosion and therefore better protected.

The images in FIG. 5 to FIG. 11 and FIG. 14 and FIG. 15 were recorded with an electron microscope FEI Quanta 3D 200 scanning electron microscope with EDX from EDAX in combination with a solid-state back-scattered electron imaging system (SSBSED) and a secondary electron detector (ETD or Everhart-Thornley detector).

Figure 17:
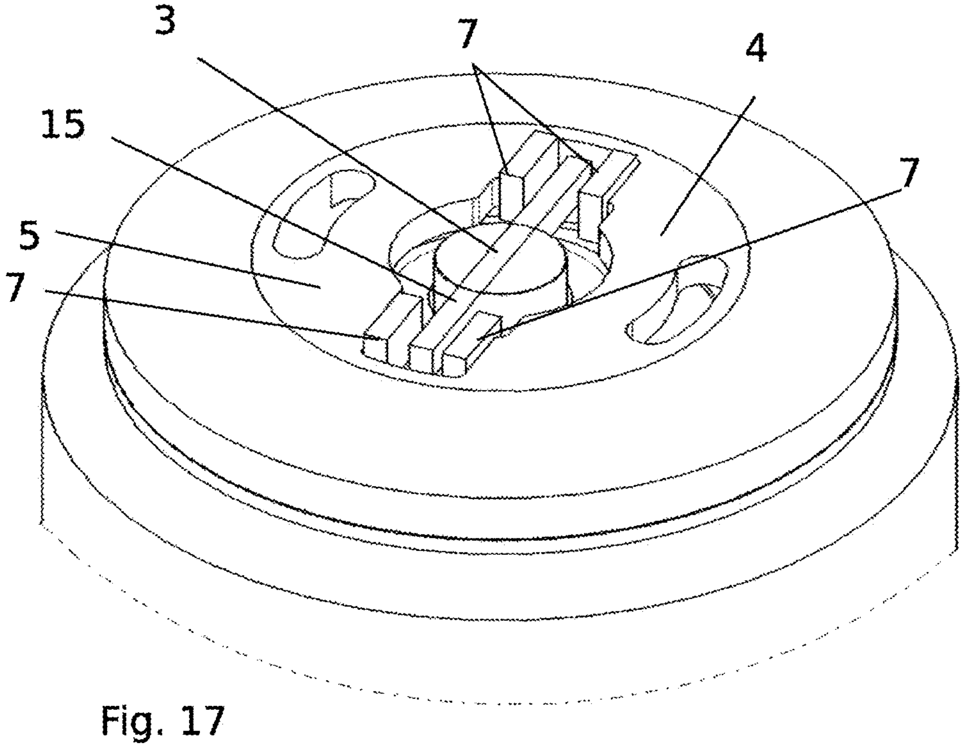
FIG. 17 shows an alternative embodiment of the spark plug of the invention in isometric view.

As shown in FIG. 17 and FIG. 18, it is optionally also possible for two or more electrode materials 2 or electrode platelets 7 to be disposed on a common carrier material 1 and to be bonded simultaneously thereto by the process of the invention.

The electrodes produced by the process of the invention were then incorporated into spark plugs and subjected to trials in a test setup and under real conditions. After an operating time of several hours, by contrast with spark plugs from the prior art, no adverse effects were apparent. The setup in which the spark plugs were installed was operated at high average pressure and comparatively high temperatures using combustible gas, without any impairment of the bond in spark plugs of the invention.

The ignition devices and spark plugs that have been produced by the process of the invention achieved a service life of >4300 h in examinations. Spark plugs that were produced by weld bonding according to the prior art and installed in the same test setup and hence exposed to the identical process conditions throughout achieved a service life of <2000 h before failure through wear or before exceedance of the electrical and thermal load limit. Therein, the prior art spark plugs became unusable even after 1200 h to 1800 h.

The bond established by the process of the invention between the electrode material 2 and the carrier material 1 was strong enough in the examinations not to be damaged by cracking, hot gas corrosion, spark erosion or any other effect that reduces service life, which would have caused the electrode platelet 7 or the electrode material 2 to fall off and the ignition device or spark plug to fail. In addition, it was found that optimized thermal conduction of the two-dimensional bond reduces the temperature of the electrode platelets 7 or of the electrode material 2 compared to ignition devices or spark plugs according to the prior art, and hence slows burnoff of the electrode material 2, which results in a longer service life.

These advantageous effects are founded in interaction with a strong and high-strength bond on the one hand, and the (full-) area bond between the electrode material 2 and the carrier material 1 which is achieved by the process of the invention on the other hand.

Figure 16:
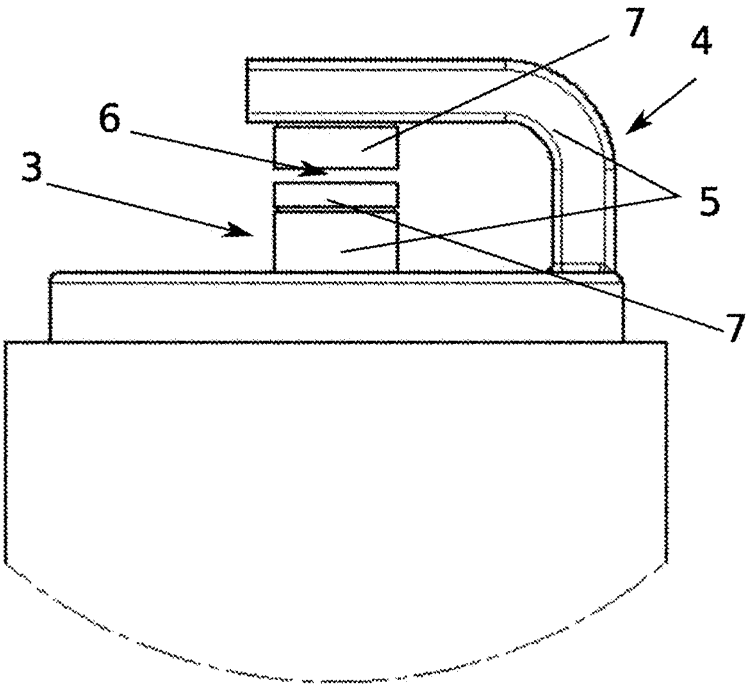
FIG. 16 shows a spark plug of the invention in a schematic diagram.

FIG. 16 and FIG. 17 show two spark plugs in two different illustrative embodiments. The spark plug shown in FIG. 16 has a first electrode 3, formed as the center electrode. The spark plug also has a second electrode 4, formed as the ground electrode. Between the first electrode 3 and the second electrode 4 is formed an ignition gap 6 at which the spark between the first electrode 3 and the second electrode 4 may be formed. The first electrode 3 and the second electrode 4 each have a carrier 5 that may consist of a nickel or iron material or Inconel or refractory metal. Electrode platelets 7 are disposed on the carrier 5, in each case directed in the direction of the ignition gap 6, between which the ignition spark is then generated. The bond between the carrier 5 and the electrode platelets 7 was established in each case by above-described processes of the invention. The carrier 5 is designed as carrier material 1 and the electrode platelet 7 as electrode material 2. The carrier material 5, in the embodiment shown in FIG. 16, consists of a nickel material, and the electrode platelet 7 is formed from a precious metal, an iridium-rhodium alloy. The electrode platelets 7 of the electrodes 3, 4 are bonded over the full area to the carrier materials 5, in each case via a diffusion bond as described for FIG. 5 to FIG. 10, but may also be established by means of a solder as described for FIG. 11 or by means of an intermediate material.

FIG. 17 shows a further alternative embodiment of the spark plug of the invention in isometric view. The spark plug has two electrodes 3, 4, where the first electrode 3 is formed as the center electrode and the second electrode 4 as the ground electrode. An ignition electrode 15 extends radially outward from the first electrode 3. The second electrode 4 in each case has two electrode platelets 7 arranged opposite the ignition electrode 15. An ignition gap 6 is formed in each case between the ignition electrode 15 and the four electrode platelets 7 arranged on the second electrode 4. The electrode platelets 7 are arranged on a carrier 5 of the ground electrode or of the second electrode 4 and bonded thereto via a production process of the invention. The carrier 5 takes the form of the carrier material 1, and the electrode platelets 7 take the form of the electrode material 2. A full-area bond between the electrode platelets 7 and the carrier 5 was established by the process of the invention.

As an option for the spark plugs shown in FIG. 16 and FIG. 17, the carriers 5 may be formed from a titanium, nickel or iron alloy, especially from a nickel or chromium-nickel alloy, stainless steel, for example an FeCrNi alloy, or Inconel, for example NiCrFe, or a refractory metal, for example tungsten. The electrode platelets 7 are preferably formed from a precious metal, especially platinum, iridium, rhodium, ruthenium or an alloy thereof.

The spark plugs of the invention, by contrast with the spark plugs known from the prior art, have a longer lifetime by virtue of the two-dimensional, preferably full-area, and stronger bond between the electrode material 2 and the carrier material 1 or between the carrier 5 and the electrode platelet 7, and therefore permit longer hours of use and reliable operation of the spark plugs of the invention.

As an option for the embodiments of the spark plugs shown in FIG. 16 and FIG. 17, spark plugs of the invention may also have different shapes, where spark plugs of the invention have a two-dimensional, especially full-area, and uniform bond between the electrode material 2 and the carrier material 1.

As an alternative to the spark plugs shown in FIG. 16 and FIG. 17, other ignition devices may also be produced by the process of the invention, where the ignition devices have electrodes having a carrier material 1 and an electrode material 2 that form a two-dimensional bond by a process of the invention. Such ignition devices may, for example, have one or more electrode pairs. Such ignition devices may, for example, be annular gap spark plugs, ax-type spark plugs or crown spark plugs.

It is optionally possible for the electrodes produced by the process of the invention also to be subjected to a pretreatment for positioning. For example, the electrode material 2 may thus be subjected to spot attachment or fixing to the carrier material 1 by point welding or laser adhesion.

With regard to the embodiments of the invention, the amount of heat which is released to the joining face 8, the carrier material 1 and/or the electrode material 2 to raise them to the joining temperature $T_F$ is advantageously generated by induction, radiative heat or thermal conduction.

The invention claimed is:

1. A process for producing an electrode for an ignition device, which comprises the steps of:

placing a metallic electrode material against a metallic carrier material at a joining face, wherein the metallic carrier material and the metallic electrode material are pressed against one another with a defined area pressure at the joining face and are positioned in a chamber in which a reduced pressure and/or a defined atmosphere is generated, wherein the metallic carrier material is formed from a material selected from the group consisting of: nickel, a chromium-nickel alloy, steel, nickel in pure form, nickel base alloys, FeCrNi stainless steel and FeCrNiMo stainless steel;

applying the reduced pressure and/or the defined atmosphere in the chamber;

heating the joining face uniformly to a joining temperature, the joining temperature being below a melting temperature of the metallic carrier material and the metallic electrode material; and maintaining the joining temperature for a joining time such that a bond between the metallic carrier material and the metallic electrode material is formed at the joining face, and the metallic carrier material and the metallic electrode material collectively form a uniform connection which is two-dimensional proceeding from the joining face.

2. The process according to claim 1, wherein an amount of heat which is released to the joining face to raise the metallic carrier material and the metallic electrode material to the joining temperature is generated by means of induction, radiative heat or conduction of heat.

3. The process according to claim 1, which further comprises maintaining the joining temperature for the joining time such that a metallic connection in a form of metallic bonds is formed without formation of intermetallic phases between the metallic carrier material and the metallic electrode material, wherein a diffusion of the metallic electrode material into the metallic carrier material and/or a diffusion of atoms and/or ions of the metallic carrier material into the metallic electrode material is not less than 0.05 μm.

4. The process according to claim 1, which further comprises pressing the metallic carrier material and the metallic electrode material against one another with a minimum contact pressure of 10 $mN/mm^2$ to 2500 $mN/mm^2$.

5. The process according to claim 1, which further comprises conducting the process under vacuum, under a reduced pressure and/or under a reduced-oxygen atmosphere and/or under an inert and/or a reducing atmosphere, where the vacuum, the reduced pressure and/or the reduced-oxygen, and/or the inert and/or the reducing atmosphere is varied in a course of the process.

6. The process according to claim 1, which further comprises setting the joining temperature to 30% to 98% of the melting temperature of the metallic carrier material and/or of the metallic electrode material.

7. The process according to claim 1, wherein the joining time after exceedance of a threshold temperature of 30% of the melting temperature of the metallic carrier material and/or of the metallic electrode material is 1 min to 24 h.

8. The process according to claim 1, wherein the joining face has a size of 1 $mm^2$ to 50 $mm^2$.

9. The process according to claim 1, wherein the metallic electrode material has a thickness of 0.05 mm to 2 mm.

10. The process according to claim 1, wherein the metallic electrode material contains a material from element group 4 to 11 or from titanium, vanadium, chromium, manganese, iron, cobalt, nickel or copper group, platinum, iridium, rhodium, ruthenium, rhenium or an alloy thereof.

11. The process according to claim 1, wherein a solder material is applied or mounted or introduced on and/or alongside the joining face before or after the positioning of the metallic electrode material on the metallic carrier material, where the joining temperature is above a melting temperature of the solder and in each case below the melting temperature of the metallic carrier material and the metallic electrode material, where the joining time after exceedance of the metallic melting temperature of the solder material is in particular 10 seconds to 2 hours.

12. The process according to claim 11, wherein a solder base material of the solder material is selected from a material from element groups 9 to 11 or from cobalt, nickel or copper group or an alloy thereof, where the solder base material of the solder material includes alloy additions from element groups 4 to 15, where the solder material consists of silver, gold or nickel as the solder base material.

13. The process according to claim 1, wherein the metallic carrier material has a depression formed therein, wherein the metallic electrode material when placed against the metallic carrier material is at least partly in a countersunk arrangement in the depression.

14. The process according to claim 1, wherein:

there is an intermediate material disposed atop the metallic carrier material or the metallic electrode material, between the metallic carrier material and the metallic electrode material;

the joining face is formed in each case between the metallic carrier material and the intermediate material and the metallic electrode material and the intermediate material;

the joining temperature is below the melting temperature of the metallic carrier material and of the metallic electrode material and of the intermediate material; and the metallic carrier material forms a two-dimensional bond in each case with the intermediate material, and the metallic electrode material with the intermediate material.

15. The process according to claim 14, wherein:

the intermediate material takes a form of a diffusion-accelerating material; and a diffusion of atoms and/or ions of the metallic electrode material through the intermediate material into the metallic carrier material and/or the diffusion of atoms and/or ions of the metallic carrier material through the intermediate material into the metallic electrode material is accelerated by the intermediate material.

16. The process according to claim 1, wherein the metallic carrier material and/or the metallic electrode material has an average roughness Ra at the joining face of 0.01 μm to 6.3 μm.

17. The process according to claim 1, wherein a plurality of carrier materials and electrode materials each form a stacked arrangement in pairs, where the carrier materials to be bonded in pairs and the electrode materials are separated from one another in each case with respect to other pairs by a separating material and/or a separating layer.

18. A process for producing a spark plug, which further comprises:

forming a first electrode and a second electrode;

forming an ignition gap between the first electrode and the second electrode;

forming a carrier composed of a carrier material at the first electrode and/or the second electrode;

disposing an electrode platelet formed of an electrode material and directed in a direction of the ignition gap on the carrier; and establishing a bond between the carrier and the electrode platelet by the process according to claim 1.

19. A spark plug, comprising:

a second electrode;

an ignition gap formed between said first electrode and said second electrode; and said first electrode and/or said second electrode has a carrier and on said carrier there is disposed an electrode platelet directed in a direction of said ignition gap, and a bond between said carrier and said electrode platelet has been established by the process according to claim 1, wherein said carrier takes a form of the metallic carrier material and the electrode platelet takes a form of the metallic electrode material.

20. The spark plug according to claim 19, wherein:

said carrier is formed from one of nickel, a chromium-nickel alloy, steel, a nickel in pure form, nickel base alloys, a FeCrNi stainless steel or a FeCrNiMo stainless steel;

said electrode platelet is formed from a precious metal; and said electrode platelet includes an alloy composed of PtRh 90/10 and said carrier includes an alloy of VDM Nickel 201 or EN 2.4068, or said electrode platelet includes an alloy of IrRh 90/10 and said carrier includes an alloy of VDM Nickel 201 or EN 2.4068.

21. An ignition device, comprising:

a first electrode;

a second electrode;

an ignition gap being formed between said first electrode and said second electrode;

said first electrode and/or said second electrode have a carrier, and on said carrier an electrode platelet is disposed and directed in a direction of said ignition gap;

said carrier and said electrode platelet have a two-dimensional, uniform connection with one another, wherein a bond between said carrier and said electrode platelet is established by the process according to claim 1;

a diffusion zone being formed in a region of a two-dimensional bond between said carrier and said electrode platelet, in which there is a concentration of a material of said carrier proceeding from said carrier in a direction of said electrode platelet from 100% to 0% and a concentration of a material of said electrode platelet proceeding from said carrier in the direction of said electrode platelet from 0% to 100%; and a diffusion depth of said diffusion zone is not less than 0.05 μm.

22. The ignition device according to claim 21, wherein:

said carrier is formed of at least one of nickel, a chromium-nickel alloy, steel, nickel in pure form, nickel base alloys, a FeCrNi stainless steel or a FeCrNiMo stainless steel;

said electrode platelet is formed from a precious metal; and said electrode platelet includes an alloy composed of PtRh 90/10 and said carrier includes an alloy of VDM Nickel 201 or EN 2.4068, or said electrode platelet includes an alloy of IrRh 90/10 and said carrier includes an alloy of VDM Nickel 201 or EN 2.4068.

* * * * *